United States Patent
Sun et al.

(10) Patent No.: US 8,856,452 B2
(45) Date of Patent: Oct. 7, 2014

(54) TIMING-AWARE DATA PREFETCHING FOR MICROPROCESSORS

(75) Inventors: Xian-He Sun, Darien, IL (US); Yong Chen, Lubbock, TX (US); Huaiyu Zhu, Champaign, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 13/149,425

(22) Filed: May 31, 2011

(65) Prior Publication Data

US 2012/0311270 A1    Dec. 6, 2012

(51) Int. Cl.
*G06F 12/02* (2006.01)
*G06F 12/08* (2006.01)

(52) U.S. Cl.
CPC ................. *G06F 12/0862* (2013.01)
USPC ........... 711/137; 711/154; 711/204; 711/213; 711/E12.004; 711/E12.075; 711/167

(58) Field of Classification Search
CPC ... G06F 9/383; G06F 9/3842; G06F 9/30047; G06F 9/3861; G06F 9/3869; G06F 9/3455; G06F 9/3802; G06F 9/3844; G06F 2212/6028; G06F 2212/6022; G06F 2212/6026; G06F 2212/502; G06F 2212/654; G06F 8/4442; G06F 11/30; G06F 12/0862
USPC .......... 711/137, 204–208, 213, E12.057, 154, 711/E12.004, 168
See application file for complete search history.

(56) References Cited

U.S. PATENT DOCUMENTS

| | | | |
|---|---|---|---|
| 5,361,391 A | | 11/1994 | Westberg |
| 5,649,144 A | | 7/1997 | Gostin et al. |
| 5,778,435 A | * | 7/1998 | Berenbaum et al. .......... 711/137 |
| 5,915,104 A | | 6/1999 | Miller |
| 5,944,815 A | | 8/1999 | Witt |
| 5,950,007 A | | 9/1999 | Nishiyama et al. |
| 6,134,710 A | * | 10/2000 | Levine et al. ................. 717/158 |
| 6,341,370 B1 | | 1/2002 | Tirumalai et al. |
| 6,421,762 B1 | | 7/2002 | Arimilli et al. |
| 6,792,496 B2 | | 9/2004 | Aboulenein et al. |
| 6,820,173 B1 | * | 11/2004 | Bittel et al. ................... 711/137 |

(Continued)

FOREIGN PATENT DOCUMENTS

| | | |
|---|---|---|
| WO | WO 99/64954 A2 | 12/1999 |
| WO | WO 02/27498 A2 | 4/2002 |

OTHER PUBLICATIONS

H. Zhu et al., "Timing Local Streams: Improving Timeliness in Data Prefetching," in Proc. 24th Int'l Conerence on Supercomputing (ISC'10), Jun. 2010 (10 pages).

(Continued)

*Primary Examiner* — Sanjiv Shah
*Assistant Examiner* — Edward Waddy, Jr.
(74) *Attorney, Agent, or Firm* — Pauley Petersen & Erickson

(57) ABSTRACT

A method and apparatus for prefetching data from memory for a multicore data processor. A prefetcher issues a plurality of requests to prefetch data from a memory device to a memory cache. Consecutive cache misses are recorded in response to at least two of the plurality of requests. A time between the cache misses is determined and a timing of a further request to prefetch data from the memory device to the memory cache is altered as a function of the determined time between the two cache misses.

20 Claims, 13 Drawing Sheets

(56) References Cited

U.S. PATENT DOCUMENTS

| | | | |
|---|---|---|---|
| 6,895,496 B1 | 5/2005 | Taniguchi et al. | |
| 6,901,486 B2 | 5/2005 | Handgen et al. | |
| 6,959,363 B2* | 10/2005 | Southwell et al. | 711/137 |
| 7,000,048 B2 | 2/2006 | McAlpine et al. | |
| 7,685,083 B2 | 3/2010 | Fairweather | |
| 7,689,774 B2 | 3/2010 | O'Connell et al. | |
| 7,730,470 B2 | 6/2010 | Sharapov et al. | |
| 7,774,578 B2* | 8/2010 | Keltcher | 711/213 |
| 8,504,775 B2* | 8/2013 | Plamondon | 711/137 |
| 2003/0097538 A1* | 5/2003 | Hall et al. | 711/201 |
| 2004/0022094 A1 | 2/2004 | Radhakrishnan et al. | |
| 2004/0117557 A1* | 6/2004 | Paulraj et al. | 711/137 |
| 2005/0010740 A1* | 1/2005 | Wong et al. | 711/213 |
| 2005/0210453 A1* | 9/2005 | Kimura | 717/120 |
| 2006/0041723 A1 | 2/2006 | Hakura et al. | |
| 2006/0179236 A1* | 8/2006 | Shafi | 711/137 |
| 2007/0005934 A1* | 1/2007 | Rotithor et al. | 711/213 |
| 2007/0174555 A1* | 7/2007 | Burtscher et al. | 711/137 |
| 2007/0239936 A1* | 10/2007 | Gluhovsky | 711/118 |
| 2007/0283101 A1* | 12/2007 | El-Essawy et al. | 711/137 |
| 2010/0153653 A1* | 6/2010 | El-Mahdy et al. | 711/137 |
| 2010/0262750 A1* | 10/2010 | Deshpande et al. | 711/3 |
| 2010/0293339 A1 | 11/2010 | Arimilli et al. | |
| 2010/0332709 A1* | 12/2010 | Suzuki et al. | 710/240 |

OTHER PUBLICATIONS

Y. Chen et al., "An Adaptive Data Prefetcher for High-performance Processors," in Proc. 10th IEEE/ACM Int'l Symposium on Cluster, Cloud and Grid Computing (CCGridi 0). May 2010 (10 pages).

S. Byna et al., "Taxonomy of Data Prefetching for Multicore Processors," J of Computer Science & Tech., May 2009, vol. 24, No. 3, pp. 405-417.

Y. Chou, "Low-cost epoch-based correlation prefetching for commercial applicaitons," In Micro, Dec. 2007 (13 pages).

P. Diaz et al., "Stream Chaining: Exploiting Multiple Levels of Correlations in Data Prefetching," In ISCA, Jun. 2009, pp. 81-92.

K.J. Nesbit et al., "AC/DC: an adaptive data cache prefetcher," In IEEE PACT, Sep. 2004, pp. 135-145 (11 pages).

S. Somogyi et al., "Spatio-temporal memory streaming," In ISCA, 2009, Jun. 2009, pp. 69-80.

\* cited by examiner

Table 2: Statistics of behavior of the TAS prefetcher

| Benchmarks | Events (%) (d=8) | | | | | | Total Hops per Event | | | | | | NextPC Accuracy (d=8) | Configurations | |
|---|---|---|---|---|---|---|---|---|---|---|---|---|---|---|---|
| | config 1 | | config 2 | | config 3 | | config 1 | | config 2 | | config 3 | | | | |
| | single | cyclic | single | cyclic | single | cyclic | d=8 | d=16 | d=8 | d=16 | d=8 | d=16 | | | |
| bzip2 | 64.0 | 29.5 | 79.0 | 18.5 | 84.0 | 13.0 | 1.82 | 2.15 | 1.36 | 1.21 | 1.19 | 1.13 | 73% | config 1 | |
| gcc | 99.5 | 0.5 | 99.5 | 0.5 | 100.0 | 0.0 | 1.00 | 1.00 | 1.00 | 1.00 | 1.00 | 1.00 | 97% | | |
| bwaves | 33.0 | 27.0 | 57.5 | 11.0 | 71.5 | 7.0 | 2.21 | 2.00 | 1.55 | 1.47 | 1.34 | 1.27 | 67% | short | [1,1] |
| games | 12.0 | 62.0 | 33.5 | 38.5 | 35.5 | 27.0 | 4.83 | 8.16 | 3.73 | 5.65 | 3.03 | 4.12 | 56% | medium | [2,4] |
| mcf | 1.5 | 97.5 | 20.5 | 75.0 | 39.0 | 56.0 | 3.79 | 5.17 | 1.91 | 1.90 | 1.60 | 1.49 | 89% | long | [5,9] |
| milc | 5.0 | 90.0 | 14.5 | 78.0 | 14.5 | 50.0 | 5.89 | 8.26 | 3.22 | 3.38 | 2.21 | 2.48 | 35% | very long | >9 |
| zeusmp | 14.5 | 47.0 | 31.0 | 37.5 | 89.0 | 4.0 | 2.13 | 2.15 | 1.72 | 1.71 | 1.11 | 1.09 | 97% | | |
| gromacs | 3.5 | 94.0 | 4.5 | 93.5 | 11.0 | 88.0 | 6.39 | 8.72 | 5.12 | 7.54 | 3.79 | 6.23 | 64% | config 2 | |
| leslie3d | 54.5 | 25.5 | 62.0 | 11.5 | 71.0 | 5.5 | 2.92 | 3.85 | 1.88 | 1.70 | 1.28 | 1.27 | 81% | | |
| gobmk | 44.5 | 52.0 | 49.0 | 44.5 | 54.5 | 37.5 | 3.57 | 5.85 | 3.18 | 5.31 | 2.81 | 4.32 | 66% | short | [1,2] |
| dealII | 41.0 | 49.5 | 56.5 | 34.5 | 68.5 | 27.5 | 2.78 | 4.80 | 2.41 | 4.26 | 2.11 | 3.23 | 64% | medium | [3,9] |
| soplex | 5.5 | 90.5 | 9.0 | 84.5 | 17.5 | 70.0 | 5.26 | 8.07 | 3.63 | 4.14 | 2.30 | 2.49 | 54% | long | [10,19] |
| hmmer | 22.5 | 42.5 | 63.0 | 7.5 | 78.0 | 4.5 | 2.67 | 3.60 | 1.69 | 2.14 | 1.35 | 1.79 | 59% | very long | >19 |
| libquantum | 100.0 | 0.0 | 100.0 | 0.0 | 100.0 | 0.0 | 1.00 | 1.00 | 1.00 | 1.00 | 1.00 | 1.00 | 100% | | |
| h264ref | 62.5 | 28.5 | 73.5 | 15.0 | 85.5 | 5.5 | 1.77 | 2.06 | 1.53 | 1.87 | 1.23 | 1.23 | 86% | config 3 | |
| tonto | 71.5 | 24.5 | 76.0 | 20.5 | 80.5 | 18.5 | 2.16 | 1.88 | 1.49 | 1.22 | 1.19 | 1.09 | 98% | | |
| lbm | 0.0 | 99.5 | 0.0 | 94.5 | 0.0 | 84.0 | 6.70 | 10.10 | 4.65 | 5.70 | 2.61 | 2.47 | 91% | short | [1,4] |
| wrf | 90.0 | 3.0 | 92.5 | 1.0 | 95.5 | 0.5 | 1.18 | 1.25 | 1.07 | 1.08 | 1.04 | 1.04 | 83% | medium | [5,19] |
| sphinx3 | 35.0 | 47.5 | 61.0 | 27.0 | 65.0 | 22.0 | 2.97 | 5.17 | 2.57 | 4.71 | 1.99 | 3.41 | 72% | long | [20,49] |
| xalancbmk | 8.5 | 71.5 | 18.5 | 60.0 | 90.5 | 6.0 | 2.11 | 2.29 | 1.94 | 1.97 | 1.18 | 1.33 | 75% | very long | >50 |
| Geomean | | | | | | | 2.71 | 3.43 | 2.07 | 2.39 | 1.62 | 1.83 | 73% | | |

FIG. 15

TIMING-AWARE DATA PREFETCHING FOR MICROPROCESSORS

FIELD OF THE INVENTION

This invention relates generally to data prefetching and, more particularly, to a data prefetching technique that integrates an awareness of time in prefetching.

BACKGROUND OF THE INVENTION

The rapid advance in semiconductor technology allows the processor speed or the aggregate processor speed on chips with multicore/manycore architectures to grow fast and steadily. The memory speed, or the data load/store performance, on the other hand, has been increasing at a snail's pace for over decades. This trend is predicted to continue in the next decade. This unbalanced performance improvement leads to one of the significant performance bottlenecks in computer architectures, known as the "memory wall" problem. Memory hierarchies have been the primary solution to bridging the processor-memory performance gap. However, due to the limited cache capacity and highly associative structure, large amount of off-chip accesses and long memory access latency still largely limit the performance. Data prefetching has been widely recognized as a companion technique of memory hierarchy solution to overcoming the memory-wall issue.

Data prefetching is a technique to fetch data for microprocessors in advance from memory systems. A data prefetcher is an on-chip hardware component that carries out data prefetching. Data prefetchers are widely adopted in microprocessor architectures to hide memory fetch latency and to overlap memory access with computation. Data prefetching techniques are widely used to bridge the growing performance gap between processor and memory. Numerous prefetching techniques have been proposed to exploit data patterns and correlations in the miss address stream. In general, the miss addresses are grouped by some common characteristics, such as program counter or memory region they belong to, into localized streams to improve prefetch accuracy and coverage. However, the existing stream localization technique lacks the timing information of misses. This drawback can lead to a large fraction of untimely prefetches, which in turn limits the effectiveness of prefetching, wastes precious bandwidth and leads to high cache pollution potentially.

Large amounts of untimely prefetches not arriving within a proper time window can result in cache pollution, bandwidth waste, and a negative impact on overall performance. In general, untimely prefetches can be categorized into two types: early prefetches and late prefetches. A prefetch is defined to be late if the prefetched data are still on the way back to the cache when an instruction requests the data. In this case, the late prefetch might not contribute much to the performance even though it is an accurate prefetch. A prefetch is defined to be early if the prefetched data are kicked out by other blocks due to the limited cache capacity before such prefetched data are accessed by the processor. Apparently, the early prefetch is not merely useless, but also imposes negative effects by causing cache pollution and waste of bandwidth. It is critical to control the number of untimely prefetches within an acceptable range to lessen the adverse impact and exploit the benefits of data prefetching.

A principle of data prefetching is that the prefetcher is able to fetch the data from a lower level memory hierarchy to a higher level closer to the processor in advance and in a timely manner. This principle requires consideration of two critical aspects of a data prefetching strategy, what to prefetch and when to prefetch. Existing data prefetching technology has been focused on the problem of what to prefetch. The other critical issue, when to prefetch, has long been neglected. The ignorance of the timing issue of prefetches can considerably affect the prefetching effectiveness. There is a continuing need for improved prefetching.

SUMMARY OF THE INVENTION

A general object of the invention is to improve data prefetching by incorporating a time consideration. A more specific objective of the invention is to overcome one or more of the problems described above.

The general object of the invention can be attained, at least in part, through a method for prefetching data from memory for a data processor, such as a multicore processor. The method includes issuing, such as by a prefetching module, a plurality of requests to prefetch data from a memory device to a memory cache; recording a first cache miss in response to one of the plurality of requests; recording a second cache miss in response to a second of the plurality of requests; determining a time between the first cache miss and the second cache miss; and altering a timing of a further request to prefetch data from the memory device to the memory cache as a function of the determined time between the first cache miss and the second cache miss.

The method can update the time between cache misses upon each further cache miss, where the updated time is determined between a most recent cache miss and a previous miss. The method can further include a step of predicting the timing of the further request as a function of the determined time between the first cache miss and the second cache miss.

In one embodiment, the method records a time for each cache miss, localizes miss address streams with an instruction address, links each miss address of the miss address streams to a corresponding recorded time for each cache miss, and determines a time distance between consecutive cache misses. The method can further include determining a plurality of time strides, each of the plurality of time strides representing a different time value, and computing further prefetch addresses based upon the miss addresses and the determined time strides.

In one embodiment of this invention, the plurality of requests to prefetch data are in a first prefetch stream, and the method links, according to cache miss timing information the first prefetch stream with a second prefetch stream including a second plurality of requests to prefetch data. The method can further include detecting an early data prefetch for the first prefetch stream; delaying the early data prefetch for the first prefetch stream; and prefetching data from the second prefetch stream during the delay for the first prefetch stream.

The prefetching module can comprise a stride prefetcher including a reference prediction table, and cache misses can be stored in the reference prediction table.

The invention further contemplates an article comprising a machine readable medium storing executable instructions for a data processor. The instructions are executable by the data processor to: issue a plurality of requests to prefetch data from a memory device to a memory cache; record a first cache miss in response to one of the plurality of requests; record a second cache miss in response to a second of the plurality of requests; determine a time between the first cache miss and the second cache miss; and alter a timing of a further request to prefetch data from the memory device to the memory cache as a function of the determined time between the first cache miss and the second cache miss. The article can include instructions for any of the method steps discussed above and further below.

The invention still further includes an apparatus for computing. The apparatus includes a client device including a processor or processing core that is capable of processing an application, and a memory system. A prefetch engine observes a data access pattern of the application processed by the client device to predict future data requests of the client device. The apparatus also includes a miss counter to measure a time of each cache miss of the prefetch engine. The invention can further include a future access predictor process for predicting the future data requests of the client device based on information from the miss counter. In particular embodiments of this invention, the apparatus includes a reference prediction table including a time distance and an address distance of cache misses.

This invention provides a mechanism referred to as a stream timing technique that can reduce untimely prefetches and in turn increase the overall processor performance. The stream timing technique of this invention is based on a stream localization technique, a widely-used technique to classify miss addresses into various streams according to a specific criteria such as from the same instruction (program counter), within the same memory region, etc., to improve the prediction accuracy and prefetch coverage. The basic idea of the stream timing technique is to keep the timing information for each stream and chain them according to the time. The time distances among accesses within a stream or across different streams are taken into account to direct prefetching. This approach can improve the timeliness of prefetches and generate prefetch candidates with a high confidence. Problems such as cache pollution and bandwidth waste caused by untimely prefetches can be effectively mitigated.

The invention also includes the incorporation of the stream timing technique with a well-known conventional stride prefetcher. The stream timing technique of this invention extends the conventional stride prefetcher into a new stride prefetcher that adds a time consideration, referred to herein as a time-aware stride (TAS) data prefetcher. Simulation experiments verified the design of the stream timing technique and the TAS prefetcher. The simulation results show that the inventive stream timing technique is promising in reducing untimely prefetches and the IPC improvement of TAS prefetcher outperforms the existing stride prefetcher by 11%.

Other objects and advantages will be apparent to those skilled in the art from the following detailed description taken in conjunction with the appended claims and drawings.

BRIEF DESCRIPTION OF THE DRAWINGS

FIG. 15 includes Table 2 of the examples.

DETAILED DESCRIPTION OF THE INVENTION

Figure 1:
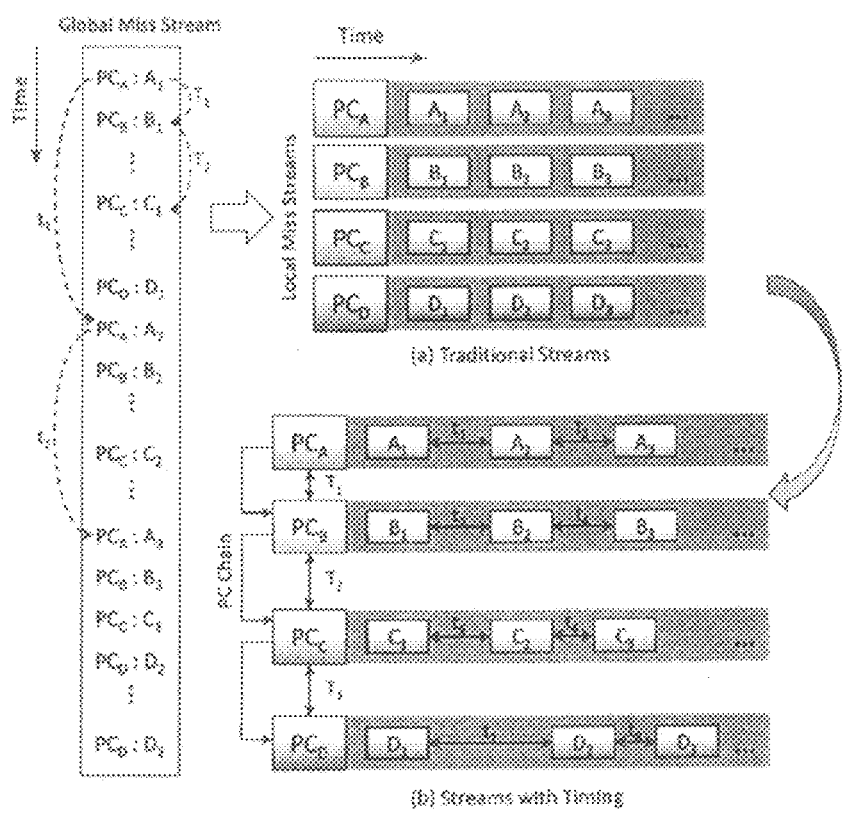
FIG. 1 illustrates a stream timing technique according to one embodiment of this invention.

The present invention increases prefetching timeliness by introducing a stream timing technique. Based on the stream timing technique, this invention introduces a timing-aware data prefetching methodology. The invention also provides a timing-aware prefetcher, including a timing aware stride (TAS) prefetcher, which adds the time consideration of the stream timing technique to improve upon stride prefetchers used in recent microprocessor architectures. The TAS prefetcher outperforms currently existing prefetchers. This invention is useful for all major microprocessor architectures, including x86, MIPS, PowerPC, and embedded architectures such as ARM.

In one embodiment of the invention, the stream timing technique keeps the timing information for each localized data access stream and chains them according to the time. The time distances among accesses within a stream or across different streams are taken into consideration to direct prefetching. The timing-aware prefetching methodology of this invention improves the timeliness of prefetches and generates prefetch candidates in an accurate and timely manner based on stream timing. The techniques of this invention do not change any existing microprocessor architecture components beyond the prefetcher component. The timing-aware prefetching and the TAS prefetcher are self-contained and do not need any change to other components. The techniques of this invention do not affect the existing data paths, thus they does not introduce extra latency for load/store instructions. The techniques of this invention are also completely transparent to programmers and users, and require relatively little effort and/or overhead to implement. This invention can benefit users' applications automatically if implemented on chip.

The method and apparatus of this invention provide data access acceleration function for microprocessors, with a particular benefit for multicore processors. The invention supports dynamic optimization, enables timely optimization, supports application-specific customized optimization. The invention also can be used to improve data access locality, reduce cache pollution of data prefetching in microprocessors, and improve the usage of the precious memory bandwidth. The invention may also have particular benefit when used in combination with a graphic processing unit (GPU). GPU success has been generally due to the ability to solve data prefetching problems for graphic applications. By incorporating prefetchers according to this invention, current GPUs can be more effective and the success of GPU can be extended to other applications.

In one embodiment of this invention, the stream timing technique allows the prefetcher to maintain timing information together with addresses so that the times of a particular miss occurrences are also predictable. This method is based on an important observation that the timing information of data accesses in a local stream exhibits perceivable patterns, i.e., the time intervals between accesses can be also discovered with patterns. For example, in a PC-localized constant-stride prefetcher, the time intervals between adjacent accesses in a certain local stream are most likely to have the same value. This observation has been verified in simulation experiments and the result shows that the time prediction in the timing-aware prefetcher can reach an average accuracy around 90%.

FIG. 1 illustrates a stream timing technique according to one embodiment of this invention. In FIG. 1, a plurality of requests is issued to prefetch data from a memory device to a memory cache. FIG. 1(a) demonstrates the local streams after localizing the plurality of requests of the global miss stream based on the program counter (PC). According to one embodiment of this invention, in addition to recording the cache misses of the plurality of requests, a time between consecutive cache misses is determined for the purpose of altering a timing of a further request to prefetch data from the memory device. FIG. 1(b) illustrates this stream timing technique of the invention, where $t_n$ represents the determined time period between a first cache miss $miss_n$ and a second cache miss $miss_{n+1}$ within a local stream. The $t_n$ chains the miss addresses in a local stream. $T_n$ shows the time intervals among different streams, which is used to link or chain different local streams. The stream timing has the ability of reconstructing the chronological order of accesses, which is critical in guiding timely prefetches.

In one embodiment of this invention, the stream timing technique is applied to provide a technique referred to herein as timing-aware data prefetching. The timing-aware data prefetching technique dynamically generates prefetch candidates across streams following the chains (with timing), instead of generating candidates only from a single stream (without timing). This intelligent technique is possible because localized streams are chained according to the timing information.

Figure 2:
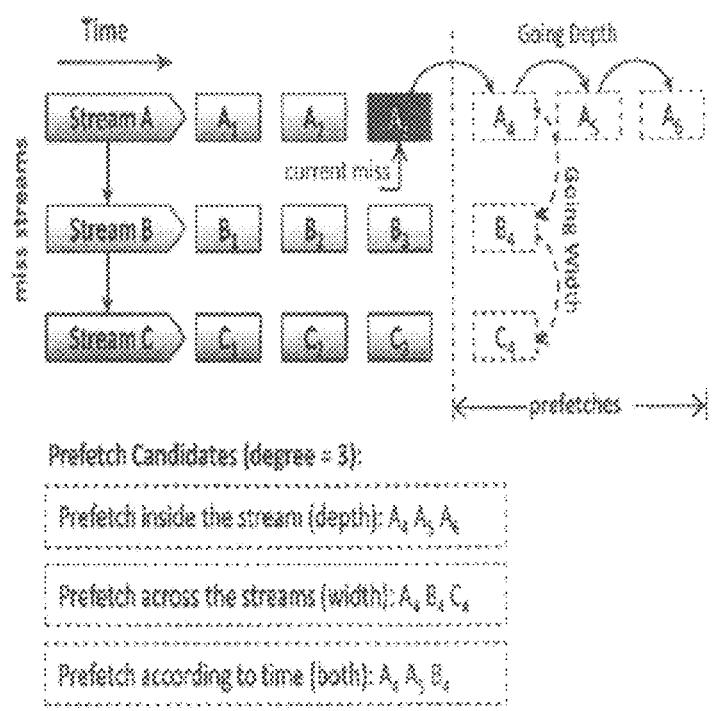
FIG. 2 illustrates a methodology of timing-aware data prefetching according to one embodiment of this invention.

FIG. 2 illustrates a methodology of timing-aware data prefetching according to one embodiment of this invention. The timing-aware data prefetching technique stores the time when a miss occurs, which is used to calculate the time interval between the last miss from the same stream and the current one. The time is also used to establish the stream chain as described in the stream timing technique. Similar to address prediction, the time interval is highly predictable with the historical time information. The timing-aware data prefetching is able to provide the prediction of both what to prefetch (the data) and when to prefetch (the time). The generation of prefetch candidates within a local stream can be thought of and referred to as depth-first generation, and the generation of candidates across chained streams as width-first generation. The timing-aware data prefetching, in essence, transforms the existing one-dimensional data prefetching (only considering the history of addresses) to a two-dimensional prefetching considering the history of both addresses and times.

In one embodiment, the methodology of timing-aware data prefetching operates as follows. If the predicted access will happen too soon, a preset prefetch distance is applied to avoid late prefetch, and the prefetcher follows the depth-first method to generate prefetch candidates. If the time interval between the current access and the predicted access is longer than a preset threshold, which indicates a case of an early prefetch, the prefetcher follows the width-first method in order to find timely prefetch candidates from other streams.

The timing-aware prefetching technique of this invention can be applied to most, if not all, of the most common prefetching algorithms currently available. A prefetcher with algorithm A is denoted as $P_A$, and a timing-aware data prefetcher with algorithm A as $P_{A+T}$. In one embodiment of this invention, the general process of $P_{A+T}$ can be divided into four steps. First, $P_{A+T}$ runs algorithm A to identify data access pattern. Second, the global miss stream is localized according to the instruction address, i.e., the program counter. Third, the localized streams are chained with stream timing technique to regain the chronicle order. Fourth, $P_{A+T}$ uses stream timing and chaining to generate and issue prefetches in a timely manner.

The timing-aware data prefetching desirably uses a miss counter that ticks upon cache misses to measure the time, i.e., the miss number. The choice of time measures is critical to timing-aware data prefetching. The usage of miss counter as the time measure has advantages over other choices such as a CPU cycle counter, instruction counter, or load/store instruction counter. First, the miss number is more accurate to represent the time. This is because that a large number of misses can indicate an early prefetch due to frequent cache replacement, whereas a long absolute time cannot if few misses appear in the future. Second, the miss number between accesses is more stable than the actual time due to the program logic. Third, the miss counter does not need frequent updates and considerable hardware storage.

Figure 3:
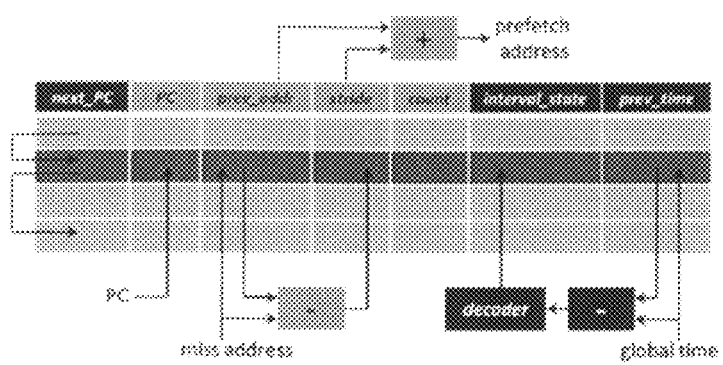
FIG. 3 illustrates a prefetcher according to one embodiment of this invention with an extended RPT table.

One exemplary embodiment of this invention incorporates the timing-aware data prefetching technique with a stride prefetching algorithm, resulting in a timing-aware stride (TAS) prefetcher. The TAS prefetcher is an instance of $P_{Stride+T}$ the class of $P_{A+T}$. The stride prefetcher and its Reference Prediction Table (RPT) based implementation (and its variations) is notably adopted in all major shipped processors including Intel Itanlium®, Xeon™ and Core™ 2 processors, AMD Athlon and Opteron processors, IBM Power6 and Power7 processors, etc. The TAS prefetcher enhances the RPT table so that the timing information of local streams can be stored. The traditional RPT entry includes at least four fields: PC, prev addr, stride, and state. The PC field represents the address of load/store instructions and is also the index of a local stream. The prev_addr field stores the last address referenced by the instruction specified in PC field. The stride field records the difference between the last two addresses in the local stream and is used to predict the future address together with prey addr. In addition, a two-bit saturating counter, increasing upon a stride match and decreasing upon a mismatch, is used in each entry for making a prefetching decision. In one embodiment, the TAS prefetcher extends the RPT table with three new fields for each entry as shown in FIG. 3: 1) prev_time field: the global time when the address in the stream is last referenced; 2) next_PC field: a pointer linking to a local stream which is closest in time after the current one; and 3) interval_state field: a two-bit state indicator denoting the time interval length between addresses in the local stream with four possible states: short, medium, long, and very long. The time interval is derived by subtracting prev_time from current global time, and it is used to determine the interval state. These new fields in each entry are used to make local streams chained and time-stamped. Compared to the conventional stride prefetcher, the new entries in the TAS prefetcher build relations between different local streams by connecting and timing them. The new TAS prefetcher generates timely and optimal prefetch candidates than existing stride prefetchers.

Figure 4:
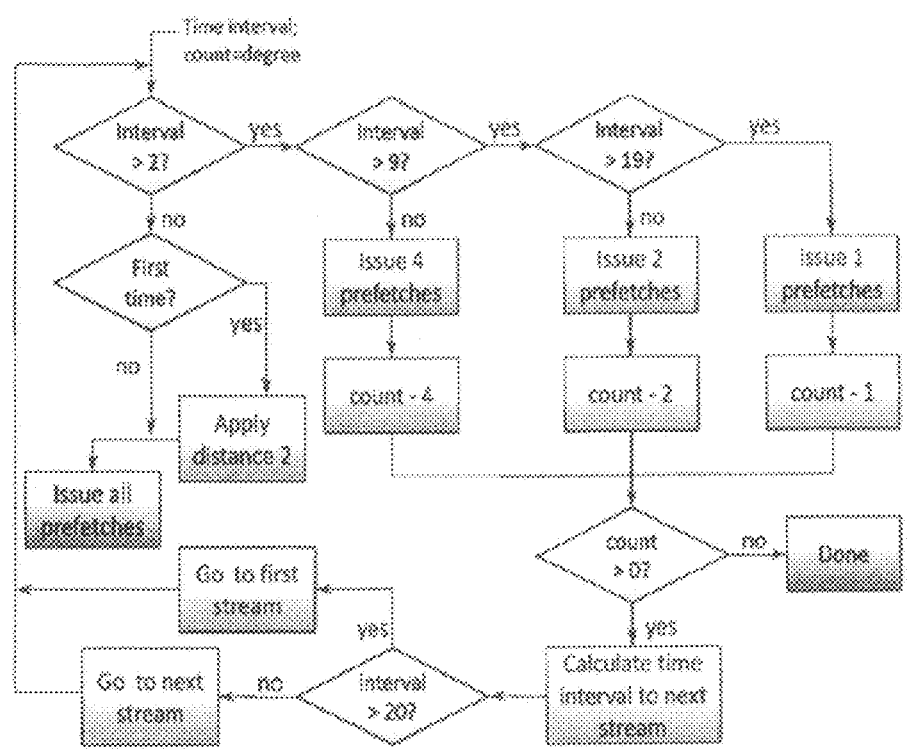
FIG. 4 illustrates an exemplary timing-aware stride prefetcher operation with the classification of the time intervals.

In one embodiment of this invention, the TAS prefetcher classifies the time intervals between misses into four categories: "short time" ranges from 1 to 2 misses; "medium time" ranges from 3 to 9 misses; "long time" ranges from 10 to 19 misses and "very long time" is over 19 misses. These thresholds have been chosen based on experiments and empirical experience. FIG. 4 illustrates an exemplary TAS operation with the classification of the time intervals. First, the TAS prefetcher finds the corresponding stream matching the PC of current miss. Second, the TAS prefetcher checks the current interval state and takes a corresponding action. If the time interval is short for current stream and it is the first time accessing the stream during this prefetching iteration, the prefetcher skips two blocks (prefetch distance) following the current miss to avoid late prefetches and issues all prefetches according to the prefetch degree. If the time interval is medium, it is not necessary to apply prefetch distance because the longer interval between misses can tolerate the fetch latency well. Instead, the prefetcher only issues half of the prefetches in order to prevent potential early prefetches. Different from the medium time interval case, for the long or very long time interval cases, the prefetcher issues one quarter of the prefetches or one prefetch, respectively, for the current stream. Third, when there are still prefetches left after prefetching on the first stream, the TAS prefetcher attempts going width following the next PC pointer to find local streams that are within a 20 time period and ready to prefetch, and then prefetches on these streams. The prefetching rules for these streams are same with the first one. Fourth, if the TAS prefetcher has traversed all the streams during the time period along the stream chain while the prefetches are not completely issued, the prefetcher will go back to the first stream and repeat the operation until all of them are done.

This invention can include additional hardware or software support compared to existing prefetch architectures. A timer is generally needed that ticks every time the Lowest Level Cache (LLC) miss occurs. This timer can be implemented with a register that self increments each time a LLC miss event happens. The miss address streams need to be localized with the instruction address, i.e., the program counter (PC). The global miss address stream is localized to many local streams according to the PC value. Local miss address streams need to be chained by the time (the value of the timer register) of the occurrence of the miss stream. Miss addresses within each local miss address stream need to be chained by the time (the value of the timer register) of the occurrence of each miss address. A decoder can be used to determine whether the time distance between miss addresses is "short", "medium", "long", or "very long." An additional computation unit can be used to compute the prefetch addresses based on the current miss address and the predicted strides.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Figure 5:
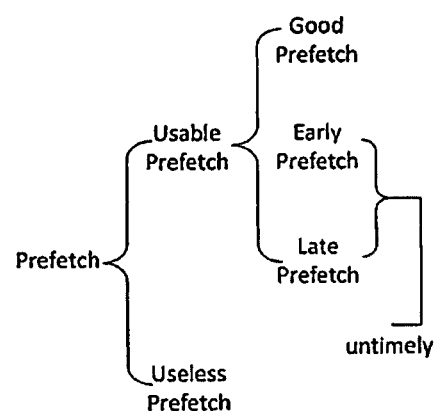
FIG. 5 illustrates a classification of prefetches.

Three commonly used metrics for evaluating a prefetching algorithm include accuracy, coverage and timeliness. Prefetching accuracy is the percentage of prefetches accessed before they are evicted from the cache out of the overall prefetches. A high accuracy helps the prefetcher avoid potential cache pollution caused by useless prefetches. The prefetching coverage measures the ratio of raw misses (misses without prefetch) reduced by prefetches. The prefetching coverage describes the ability of detecting and correctly predicting the future misses by a prefetcher. Prefetching timeliness represents the capability of issuing timely prefetches by a prefetcher. In this example, both late prefetches and early prefetches are considered as untimely prefetches, and the invention seeks to improve the timeliness by reducing them or converting them into good prefetches. FIG. 5 shows a classification of prefetches. Prefetches are classified as useless if they are not accessed during the whole lifetime of the application. These prefetches do not help reduce cache misses, but instead, lower the accuracy and lead to problems such as cache pollution and bandwidth consumption. As opposed to useless prefetches, usable prefetches are those accessed by the processor, which include good, late and early prefetches. The good prefetches are those issued by a prefetcher and then accessed by the processor later. For late and early prefetches, although they are correct predictions of future misses, they fail to hide the full memory-access latency efficiently since they are not issued at a proper time. Prefetching performance can be improved significantly if untimely prefetches can be converted into timely ones.

The interplay of accuracy, coverage and timeliness are usually complicated. In most cases, a method improving one of them is not able to juggle the other two. To provide high prefetching accuracy, a stream localization technique is widely used. The rationale of stream localization is that the prefetcher separates the global access stream (full history of memory-access addresses) according to a specific characteristic, and then makes the prediction based on local streams instead of the global one. The criteria for localizing streams can be the instruction address (e.g., program counter) that issues the access, memory region (memory location the access belongs to), and time period (during which period the access happens). FIG. 1(a) shows the localized streams based on PC. Due to the high predictability of data patterns and correlations in local streams, the prefetcher is likely to achieve much better accuracy. However, this strategy limits the prefetching timeliness since the chronological order of the occurrence of accesses is missing in local streams. Thus, it is a challenging task for a data prefetcher to generate timely prefetches.

The stream timing mechanism of this invention addresses a problem of poor timeliness support found in existing stream localization based prefetchers. The traditional stream localization prefetcher predicts the future address according to the past access history kept in a table. The stream timing mechanism of this invention allows the prefetcher to maintain timing information together with addresses so that the time when a particular miss happens is also predictable. This method is based on an important observation that the timing information of data accesses in a local stream exhibits perceivable patterns, i.e., the time intervals between accesses can be also discovered with patterns. For example, in a PC-localized constant-stride prefetcher, the time intervals between adjacent accesses in a certain local stream are most likely to have the same value. This observation has been verified in simulation experiments and the result shows that the time prediction in the TAS prefetcher of this invention can reach an average accuracy around 90% (discussed further below). As discussed above, FIG. 1(b) illustrates a sample scenario of stream timing, where $t_n$ represents the time period between $miss_n$ and $miss_{n+1}$. T shows the time intervals among different streams, which is also used to chain local streams. The ability of reconstruction of the chronological order of accesses is critical in guiding timely prefetches.

As discussed previously, when local streams are chained according to the timing information, an alternative way of selecting prefetch candidates is possible, which is to select prefetch candidates across streams following the chains, instead of selecting candidates only from a single stream. FIG. 2 illustrates how these two different prefetch strategies function. The method of this invention records the time when an access is requested, which is used to calculate the time interval between the last access from the same stream and the current one. Meanwhile, the time is regarded as the stream time that indicates the latest access from this stream, and is used to establish the stream chain.

Similar to address prediction, the time is highly predictable with the help of the historical time information. Thus, distinct from an uncertain speculation on when to prefetch, the proposed stream timing technique is able to provide both future access addresses and times. In one embodiment, the basic methodology of taking advantage of timing information operates as follows. If the predicted access will happen too soon, a preset prefetch distance will be performed to avoid late prefetch and the depth is followed to select prefetch candidates. If the time interval between the current access and the predicted access is longer than a preset threshold, which indicates a case of an early prefetch, the prefetcher goes width-first in order to find timely prefetch candidates within other streams. The general process of a prefetching scheme with stream timing technique can be divided into four steps. First, the prefetcher finds a suitable algorithm to identify data patterns. Second, the global stream is localized according to a certain criteria. Third, the local streams are chained to regain the chronicle order. Finally, stream timing can be obtained and prefetches are selected and issued in a timely manner.

The choice of time measures is critical to stream timing technique. CPU cycle would seem an appropriate choice since the global cycle counter has been provided on most recent microprocessors. However, using CPU cycles to represent the time costs too much storage since the time interval between accesses can be extremely large. Other solutions like using an instruction counter, or load/store instruction counter will also waste significant hardware storage. In this example a miss counter that ticks upon cache misses is used to measure the time, i.e., the miss number. The miss counter has several merits compared with other choices. First, the miss number is more accurate to represent the time. This is because that a large number of misses can indicate an early prefetch due to frequent cache replacement, whereas a long absolute time cannot if few misses appear in the future. For instance, in a local stream, miss block A triggers prefetch for block B and the history shows the time interval between A and B is 200 misses. In this scenario, the time interval (200) is too long, thus prefetch B will be identified as an early prefetch. It does make sense since the frequent replacement caused by 200 misses is likely to evict B from cache, which suggests that B is prefetched early. The second benefit of using miss counter is that the miss number between accesses is more stable than the actual time due to the program logic. Additionally, the miss counter does not need frequent updates and considerable hardware expense.

This example examines the use of a time-aware stride (TAS) prefetcher that incorporates stream timing technique with the widely-used stride prefetcher. The Reference Prediction Table (RPT) is widely used in stride prefetchers to keep track of previous reference addresses and associated strides. In the TAS prefetcher, the RPT table was enhanced so that the time information of local streams could be stored. The traditional RPT entry includes four fields: PC, prev_addr, stride, and state. For the TAS prefetcher, the RPT table was extended with new fields prev_time, next_PC, and interval_state, as discussed above with reference to FIG. 3. These new fields in each entry are used to make local streams chained and timestamped. The stride prefetching works based on the identification of constant strides. It was observed that once the stride pattern is found, which means the prefetcher is trained, the time intervals between addresses with stride patterns tend to be in the same range, i.e., either short, medium, long, or very long. Thus, the time interval between the last two addresses in a local stream can be used to represent the one between any two consecutive addresses. FIG. 3 shows that the time interval is derived by subtracting prev_time from current global_time, and it is used to determine the interval_state. Compared to the conventional stride prefetcher, the new entries in the table build relations between different local streams by connecting and timing them. Thus, this new TAS stride prefetcher has higher confidence in finding timely and optimal prefetch candidates than existing stride prefetchers.

As mentioned previously, the time intervals between misses can be classified into four categories: "short time" ranges from 1 to 2 misses; "medium time" ranges from 3 to 9 misses; "long time" ranges from 10 to 19 misses and "very long time" is over 19 misses. With the classification of the time intervals, the TAS operated as follows. First, the prefetcher finds the corresponding stream matching the PC of current miss, which is exactly the same with the conventional stride prefetcher. Second, the prefetcher checks the current interval_state and takes a corresponding action. If the time interval is short for current stream and it is the first time accessing the stream during this prefetching round, the prefetcher skips two blocks (prefetch distance) following the current miss to avoid late prefetches and issues all prefetches according to the prefetch degree. If the time interval is medium, it is not necessary to apply prefetch distance by skipping blocks because the longer interval between misses can tolerate the fetch latency well. Instead, the prefetcher only issues half as many prefetches in order to prevent potential early prefetches. Different from medium time interval case, for the long or very long time interval cases, one quarter of prefetches or one prefetch, respectively, is/are issued for the current stream. Third, when there are still prefetches left after prefetching on the first stream, the prefetcher attempts going width-first following the next_PC pointer to find local streams that are within 20 time period and ready to prefetch, and then prefetches on these streams. The prefetching rules for these streams are the same with the first one. If the prefetcher has traversed all the streams during the time period along the stream chain while prefetches are not completely issued, the prefetcher will go back to the first stream and repeat the operation until all of them are done. FIG. 4 shows the algorithm of TAS operations.

A variant of the stride prefetcher called a multi-level stride (MLS) prefetcher was used to assess the performance of the stream timing mechanism. Similar to TAS, the MLS prefetcher chains local streams according to their times being accessed. However, the MLS prefetcher only issues one prefetch for each stream and always attempts to traverse the stream chain to find new streams. In other words, the conventional stride prefetcher was considered a special case of the TAS prefetcher that never goes the width direction in finding prefetch candidates, while the MLS prefetcher is another special case of TAS prefetcher that never goes the depth direction in finding prefetch candidates.

Experiments were conducted with a trace-driven simulator called CMP$im that characterize the memory system performance of single-threaded and multi-threaded workloads. The first Data Prefetching Competition (DPC-1) committee released a prefetcher kit that provides partial interface to make it feasible to integrate with an add-on prefetching module. The prefetcher kit contains a pin tool and a CMP$im simulator to generate traces and conduct simulation. These features were used to evaluate the stream time prefetching technique and the TAS prefetcher performance. As shown in Table 1, the simulator was configured as an out-of-order processor with a 15-stage, 4-wide pipeline (maximum of two loads and maximum of one store can be issued every cycle) and perfect branch prediction (i.e. no front-end or fetch hazard). L1 cache was set as 32 KB and 8-way set associative. L2 cache was 16-way set associative, and the capacity was varied from 512 KB to 2 MB in the experiment. The cache follows LRU replacement policy. The access latency is configured as 20 cycles for L2 cache and 200 cycles for memory.

TABLE 1

| Parameter | Value |
| --- | --- |
| Window Size | 128-entry |
| Issue Width | 4 |
| L1 Cache | 32 KB, 8-way |
| L2 Cache | 512 KB/1 MB/2 MB, 16-way |
| Block Size | 64 B |
| L2 Cache Latency | 20 cycles |
| Memory Latency | 200 cycles |
| L2 Cache Bandwidth | 1 cycle/access |
| Memory Bandwidth | 10 cycles/access |

The simulation was conducted with 20 benchmarks from SPEC-CPU2006 suite. Several benchmarks in the set were omitted because of compatibility issue with the system. The benchmarks were compiled using GCC 4.1.2 with –O3 optimization. Traces for all benchmarks were collected by fast forwarding 40 billion instructions then running 500 million instructions. The reference input size was used for all benchmarks.

The TAS prefetcher required an additional storage budget compared to the existing stride prefetcher. The hardware cost mainly comes from the enhanced parts of the reference prediction table. For this example, the table size was set as 512 entries, and 32-bit addresses were used. The next_PC field consisted of 9 bits (for referencing one of 512 entries) and the prev_time required 16 bits. The total hardware storage cost for the RPT of the stride prefetcher was: (32+32+32+2)*512=50176 bits (6.1 KB). After enhanced with three additional fields, the hardware storage required for the TAS prefetcher was: (32+32+32+2+9+2+16)*512=64000 bits (7.8 KB). The additional hardware cost for the prefetcher was 1.7 KB, which was only 27% more of the storage needed by the original stride prefetcher.

Aside from the additional storage demand, the TAS prefetcher involved extra operation time. This stems from updating new fields during table updating stage and traversal along the stream chain during prefetching stage. The major operation time overhead in comparison with the stride prefetching comes from additional "hops" it takes to move between different local streams upon a prefetching event. More details about the behavior analysis of the TAS prefetcher are given below. The results showed that, in general, the overall operation time of our prefetcher is within an acceptable range.

Figure 6:
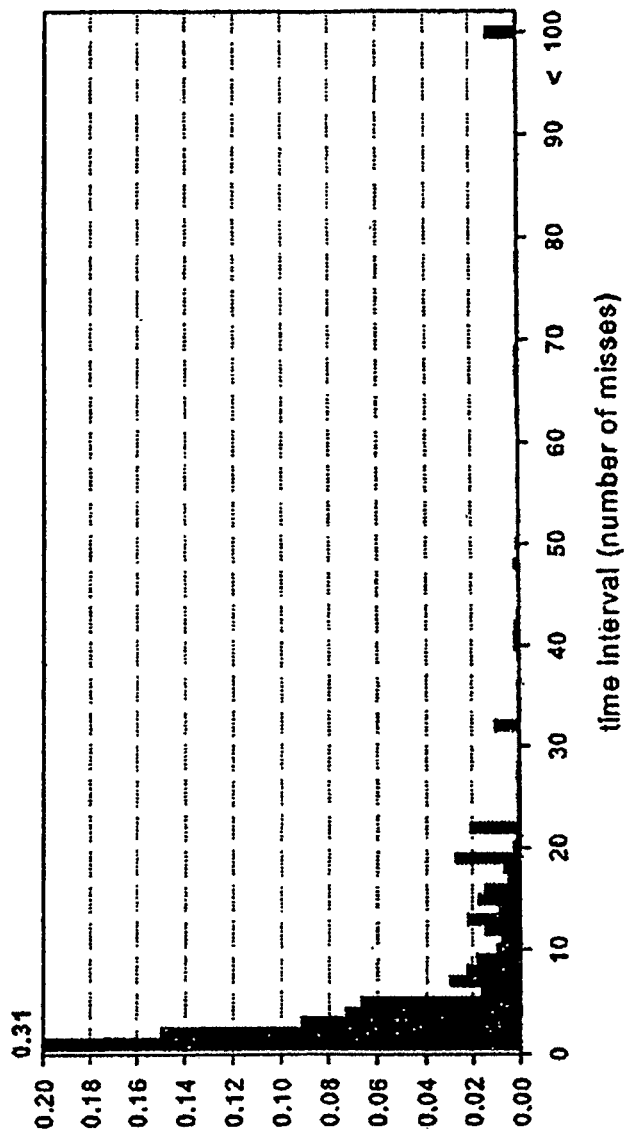
FIG. 6 summarizes a time intervals distribution of selected benchmarks.
Figure 7:
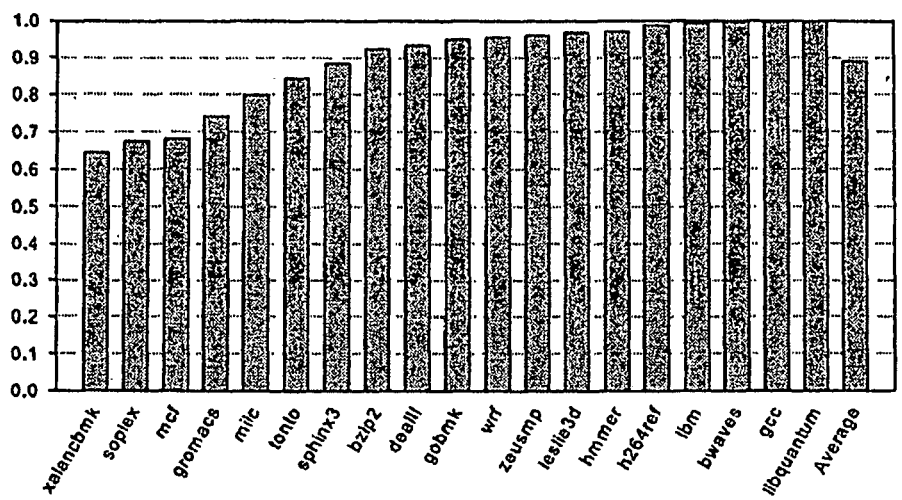
FIG. 7 illustrates the accuracy of a time prediction according to one embodiment of this invention.

The behavior of the TAS prefetcher was guided by the past history time intervals between consecutive misses in the local stream. FIG. 6 shows the time intervals distribution of all selected benchmarks. As can be clearly observed from FIG. 6, the time distance between two adjacent misses from the same instruction is likely to be small. In particular, 31% of the intervals are only one miss, which means that the corresponding misses are required by certain instruction continuously. Recalling the thresholds used to classify the time interval, the figure shows approximately 60% of the time intervals might be labeled as short. However, when the prefetch degree is high, the predicted future misses might occur a long time apart from the present time, which potentially leads to early prefetches. The assumption behind stream timing mechanism is that when the data access addresses exhibit patterns, the time of the occurrence of these accesses are highly predictable. For the TAS prefetcher, the data patterns were constant strides between addresses. The time interval between addresses was classified into four categories. Therefore, on the basis of stream timing principle, the time intervals between consecutive addresses in a local stream were expected to be in the same category and available to be used to predict the time of future accesses. FIG. 7 shows the accuracy of the time prediction (prediction of the occurrence of the accesses) following this assumption can achieve an average of 90%. The high accuracy of time prediction verifies that the assumption holds well and ensures the feasibility of the proposed mechanism.

Figure 8:
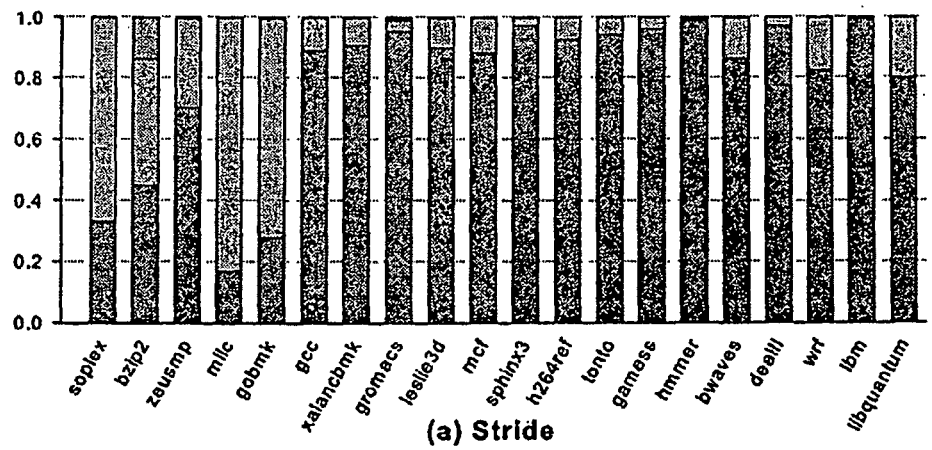
FIGS. 8(a)-(c) show the distribution of good, late, and early prefetches of three prefetchers tested in the examples below.
Figure 8:
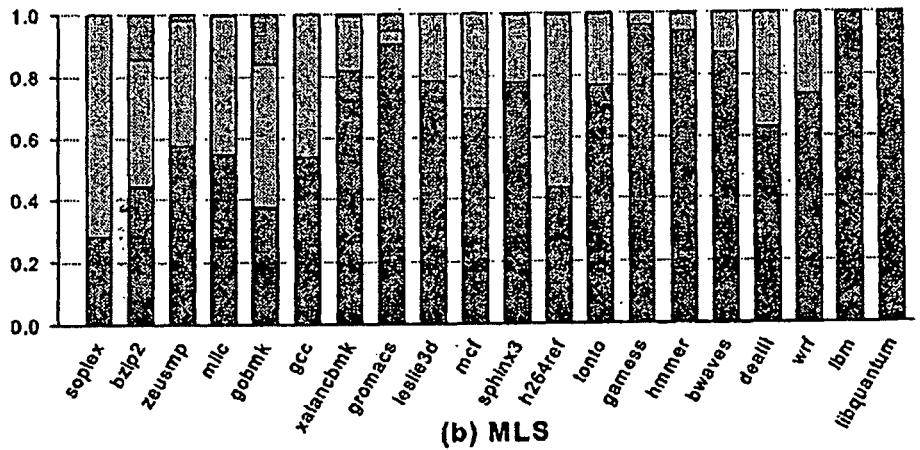
Figure 8:
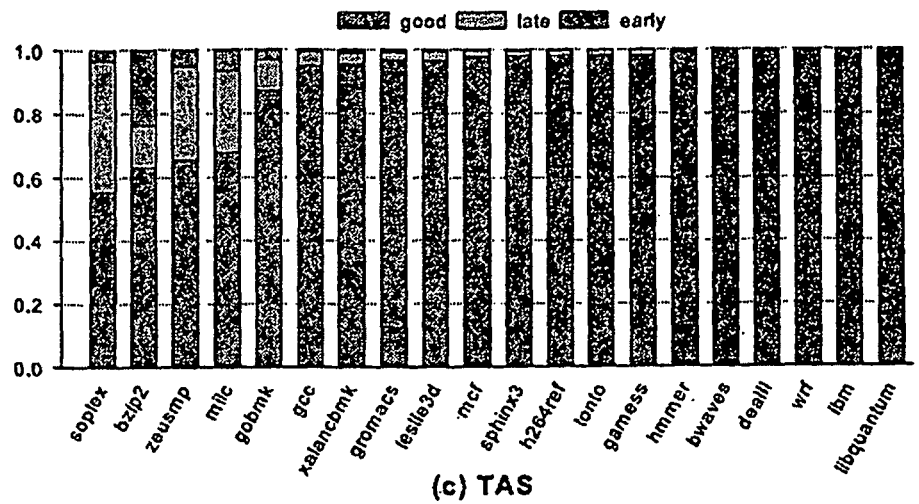
Figure 8:
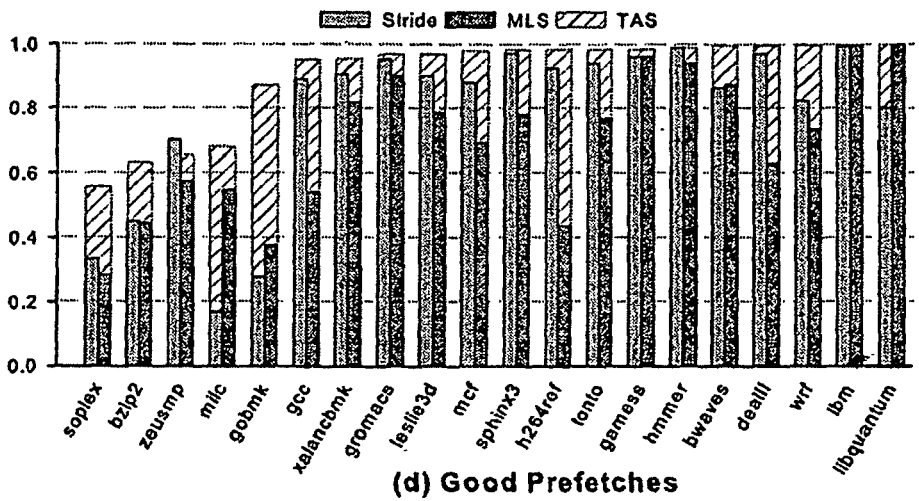

The effect of stream timing in controlling untimely prefetches and converting them into good ones was evaluated. Only the usable prefetches including early, late and good ones were considered, and the useless prefetches were ignored since it was not possible to change them into good prefetches. Three prefetchers, stride, MLS, and TAS, in which 100K prefetches are collected and categorized, were compared. FIGS. 8(a)-(c) show the distribution of the good, late, and early prefetches of the three prefetchers respectively. From FIG. 8, it can be seen that the timeliness varies for different applications and for some of them, both late and early prefetches can occur. Particularly, late prefetches are more likely to appear in stride and MLS prefetchers. That is because 8 was chosen as the prefetching degree, which is moderate and helpful to avoid early prefetches. When the degree is high, such as 32 or 64, more early prefetches will arise in both stride and MLS prefetchers. Note that MLS prefetcher performs worse than others in most of applications. In the MLS prefetcher, only one prefetch was issued on each local stream, which was easy to be late when the instruction requests it soon. Another feature of the MLS prefetcher is that it always attempted to travel along the stream chain, which increased the chances of early prefetches if the stream is far away from the current one in time.

Comparing the three prefetchers in FIG. 8, it is clear that the TAS prefetcher, benefiting from stream timing, had less untimely prefetches than the other two schemes. Although the TAS could not guarantee reduction of both late and early prefetches simultaneously, it was able to enlarge the fraction of good prefetches for most of applications, as shown in FIG. 8(d). The only exception was zeusmp, in which stride prefetching achieved more timely prefetches. Detailed analysis shows that in zeusmp the time interval between misses in local stream was very short while the time distance between different streams was long. That was the major reason that TAS had more early prefetches. Fortunately, this small portion of additional untimely prefetches did not hurt the overall performance.

Figure 9:
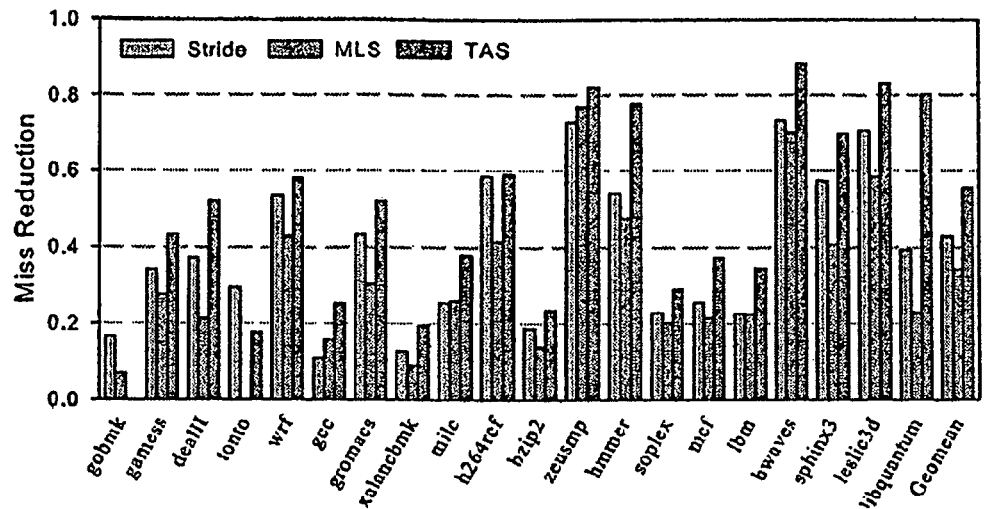
FIG. 9 reports the percentage of misses reduced by three prefetchers tested in the examples below.

FIG. 9 reports the percentage of L2 cache misses reduced by the stride, MLS, and TAS prefetchers, respectively. On average, the TAS prefetcher of this invention reduced L2 cache misses by 56% approximately, which is the best of all three prefetchers, compared to 43% of the stride prefetcher, and 34% of the MLS prefetcher. Moreover, the TAS outperformed the others in 18 out of 20 applications and only underperformed the stride prefetcher in the other two. Two benchmarks, gobmk and tonto, are the only ones on which the TAS loses effectiveness in reducing misses. Detailed analysis revealed that, in gobmk and tonto, data accesses tended to hit a certain local stream instead of jumping across different streams, which lead to wrong predictions in the TAS even though it is able to reduce some late prefetches. The considerable miss reduction in TAS mainly comes from the timeliness improved by reducing untimely misses.

Figure 10:
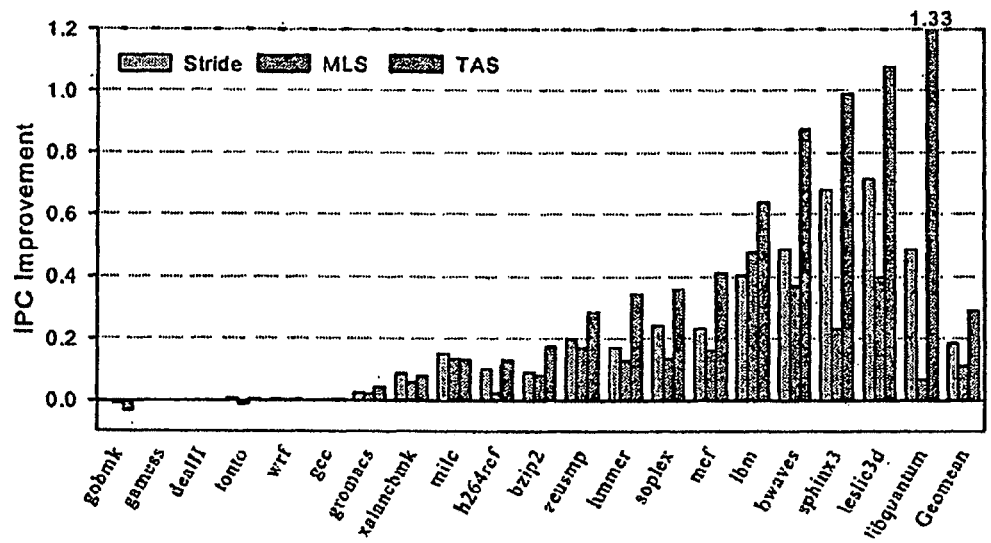
FIG. 10 shows the Instructions per Cycle improvements with respect to the base case (without prefetching) of three prefetchers tested in the examples below.

FIG. 10 shows the IPC (Instructions per Cycle) improvements with respect to the base case (without prefetching) of the stride, MLS, and TAS prefetchers. The simulation result showed that the TAS prefetcher significantly reduced the average data access latency and improved IPC considerably. The IPC improvement of the TAS prefetcher reached the peak as much as 133% in libquantum, and achieved an average speedup of 33% among all benchmarks. Compared to the other two schemes, the TAS outperformed in 16 out of 20 benchmarks and underperformed little (less than 3%) in merely 4 of them. One case of negative performance is shown for gobmk. Since all three prefetchers used the same constant stride algorithm, neither the stride nor the MLS was able to achieve positive performance on this benchmark. Fortunately, the TAS did not hurt the performance much, and the performance slowdown was only 3%. It was also observed that most of the benchmarks on which the TAS gains little performance or is outperformed by other prefetchers have a low miss rate (under 17%), which means that the efficiency of the stream timing technique is throttled by limited quantity of misses. Two exceptions are the xalancbmk and milc benchmarks. Although they have high miss rates, the TAS performed slightly worse than the stride prefetcher with no more than 2% performance difference, and this was considered acceptable. Another observation is that the MLS prefetcher had a lower average performance improvement than others. As mentioned in previous sections, the MLS prefetcher suffered the limitations of late prefetches, which caused the overall performance drop.

Figure 11:
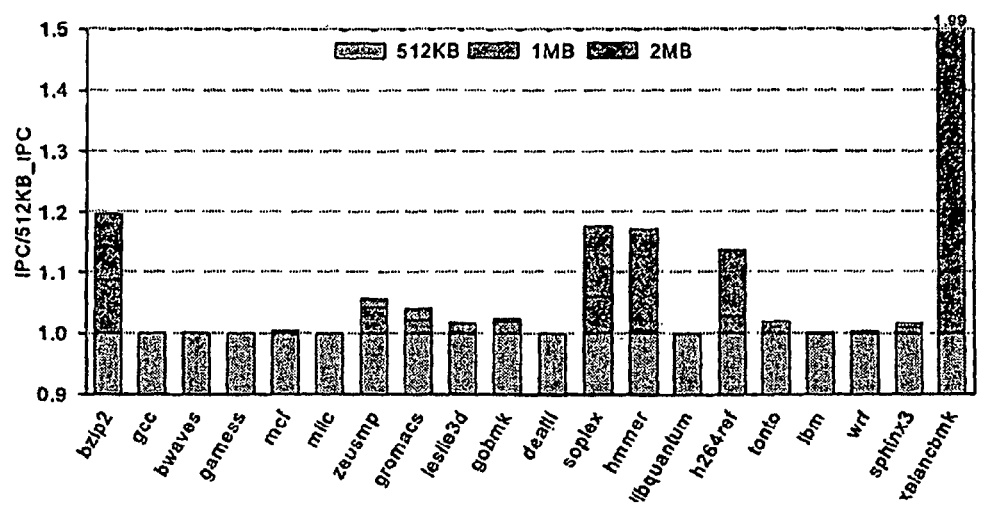
FIG. 11 shows a cache size sensitivity of benchmarks of the example below.
Figure 13:
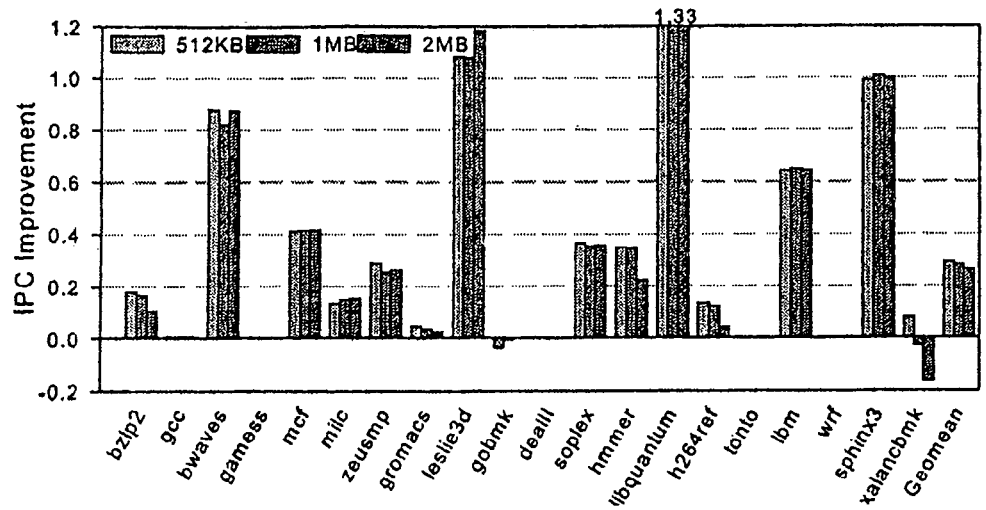
FIG. 13 demonstrates the comparison of the performance improvement of a TAS prefetcher for different cache sizes.

Cache pollution is considered as a critical side effect of data prefetching. FIG. 11 shows the cache size sensitivity of each benchmark. FIG. 13 demonstrates the comparison of the performance improvement of the TAS prefetcher for different cache sizes. The increase of cache size lowered the effectiveness of TAS prefetcher in 7 out of 20 benchmarks. These benchmarks roughly matched the ones in FIG. 11 whose performance was sensitive to cache sizes. This was because a larger cache helped to improve the performance significantly and left the TAS prefetcher little space for further improvement.

FIG. 13 shows that the TAS prefetcher gained substantial and stable performance improvement regardless of the cache size in some insensitive benchmarks such as bwaves, mcf, libquantum, and lbm. This result showed that the TAS prefetcher was successful in controlling the cache pollution, and therefore, the TAS was able to maintain high efficiency even when the cache is small. Recall that the stream timing in the TAS improved the prefetching timeliness by making most of prefetches issued at the right time, which potentially avoided cache pollution resulting from early cache line replacements.

Figure 12:
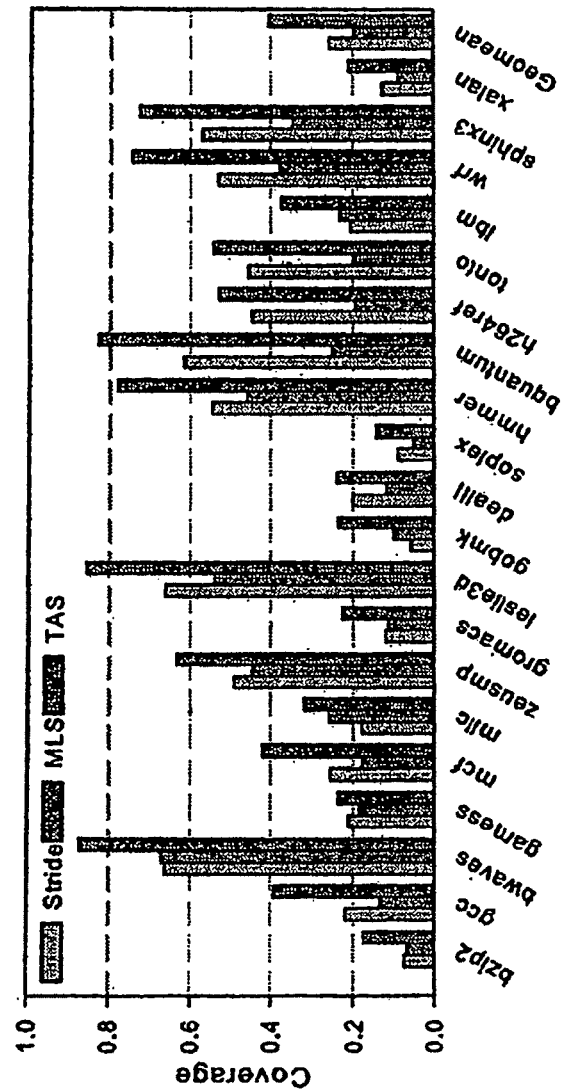
FIG. 12 shows the prefetching coverage for three prefetchers tested in the examples below.

To get a better understanding of the prefetchers' performance, advanced prefetching characteristics were evaluated from three aspects: prefetching coverage, prefetching accuracy, and prefetching behaviors. A prefetching degree of 8 and a 512 KB L2 cache was used for each prefetcher. FIG. 12 shows the prefetching coverage for the stride, MLS, and TAS prefetchers. Benefiting from the stream timing, the number of timely prefetches of the TAS prefetcher largely increased; hence, the coverage of the TAS is higher than others in every benchmark. Moreover, the geometric mean of all 20 benchmarks' coverage reached as much as 41% which can be regarded as remarkably high for a prefetcher.

Figure 14:
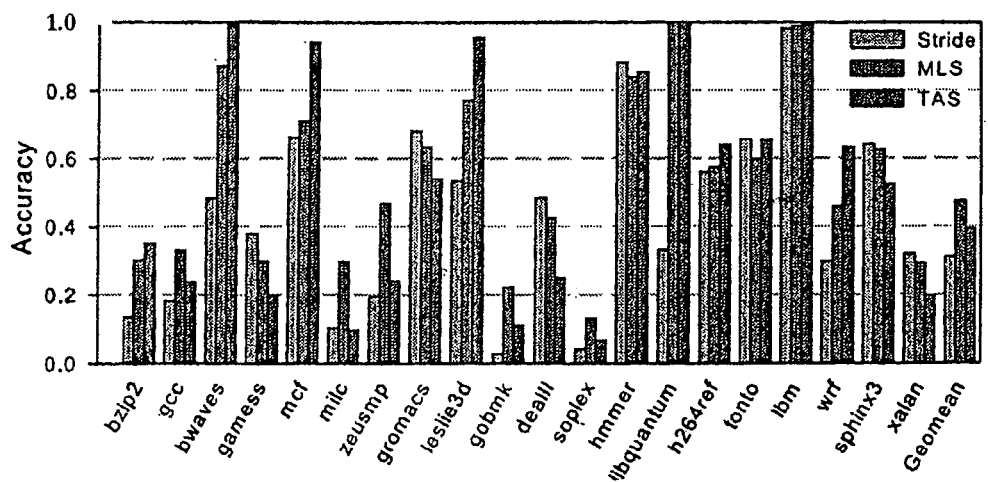
FIG. 14 shows prefetching accuracy of three prefetchers tested in the examples below.

The prefetching accuracy of the stride, MLS, and TAS prefetchers are shown in FIG. 14. The MLS prefetcher was best likely because the "one prefetch per stream" policy helped it effectively prevent data pattern change in the local streams, and therefore issued much less useless prefetches than the other two strategies. The geometric mean of accuracy of the TAS prefetcher was 40%, which was 8% lower than MLS prefetcher but 8% higher than the stride prefetcher. This result showed that the stream timing technique plays a crucial role in helping the prefetcher to maintain a relatively high accuracy and coverage while improving the timeliness.

Further analysis was performed on how the stream timing mechanism worked in the TAS prefetcher. As previously mentioned, the local streams are chained according to their time stamps so that the next stream can be successfully found. The prediction accuracy of the next stream was useful for finding proper prefetching candidates. The next stream prediction was considered accurate when the corresponding PC appeared within the next five PCs. Table 2 in FIG. 15 shows the next PC prediction accuracy when the prefetching degree was 8. The geometric mean of the accuracy of all 20 benchmarks was 73%, which was very high and therefore was helpful to achieve a high prefetching accuracy.

The stream timing mechanism seeks a better solution of prefetching by either going depth or going width. For a certain prefetching event, the prefetcher likely issues prefetches only on one local stream. In this case, the prefetching event was considered as a single event. Otherwise the prefetcher worked on multiple streams and fell in one of two other cases. The first case was that the stream chain was so short that after issuing prefetches on each stream, the number of prefetches did not satisfy the prefetching degree yet. Since the prefetcher should go back to the first stream and start prefetching again, this prefetching event is referred to as a cyclic event. The last case is that the stream chain was long enough for prefetching and is referred to as a normal event. As previously discussed, preset thresholds can classify the time interval between different misses: short, medium, long, and very long categories. To understand how these thresholds can affect the behavior of the prefetcher, two more configurations were added as shown in Table 2. From the table it can be seen that the percentage of the three prefetching events varies considerably among different benchmarks. For example, more than 99% of prefetching events were single ones in gcc (prefetcher acts similar to the conventional stride pre-fetching), which indicates that the time intervals between two adjacent misses in a stream were very short. This result also explained why little performance difference was shown between the stride and the TAS prefetchers. However, in some benchmarks such as milc, mcf, and lbm, the cyclic events became the dominant part. Another observation was that the config 1 tended to make the prefetcher go width (more cyclic events) while the config 3 tended to make the prefetcher go depth (more single events). That was because the time interval classification was the criteria of prefetching directions.

As previously discussed, the stream timing mechanism does not only consume extra storage but also requires additional operation time, which mainly comes from the traversal time of the stream chain. The average hops required per prefetching event were calculated for various configurations and degrees. In Table 2 it can be seen that the number of Hops per Event (HpE) was related with configuration and prefetching degree. A high prefetching degree usually required more HpE than lower ones since many issued prefetches cause frequent movement between streams. There was also a notable difference of HpE between the three configurations. Although the config 1 appears to be better than others since its range of short, medium, and long time classification seemed more reasonable, the HpE was much higher than other configurations which in turn added more operation time. However, config 3 was also not good because its wide range affected the performance even though the operation time was low. Thus, in this study, config 2 was used and the geometric mean of HpE of all 20 benchmarks was 2.07 when the prefetching degree was 8. In this case, the extra operation time required by using stream timing mechanism that was caused by one more hop per prefetching event was very low.

In conclusion, the stream timing technique of this invention can maintain the chronological order of localized streams and the accesses within each stream. This timing information is valuable to reduce untimely prefetches, potential cache pollution, and bandwidth consumption and to improve the effectiveness of data pre-fetching. The conventional stride data prefetcher can be extended with stream timing technique and the TAS prefetcher. The simulation testing demonstrated that the prefetching timeliness can be improved with the stream timing scheme, and this benefit can be transferred to significant performance improvement. The TAS prefetcher can achieve high coverage and accuracy, and outperforms existing stride prefetchers. The detailed study of the TAS prefetcher's characteristics verified that the hardware requirement for the proposed stream timing technique is trivial.

Thus, the invention improves data prefetching by incorporating a time consideration. The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for prefetching data from memory for data requests of a multicore data processor, comprising:
    issuing a plurality of data prefetches to a memory device within each of a plurality of concurrent prefetch streams;
    altering timings of data prefetches within each prefetch stream as a function of time between consecutive cache misses within the prefetch stream, wherein the altering comprises:
        generating a first data prefetch within one of the data streams when a predicted timing of a first data request corresponding to the first data prefetch is less than a preset threshold; and
        generating a second data prefetch within another of the data streams before the first data prefetch when a predicted timing of the first data request is greater than the preset threshold.

2. The method of claim 1, further comprising continually altering timings of future data prefetches for each of the prefetch streams as a function of each further cache miss in the each of the prefetch streams, wherein updated timings are determined between a most recent cache miss and a previous miss.

3. The method of claim 1, wherein all of the plurality of concurrent data streams are linked to avoid early prefetches by delaying data prefetches within corresponding data streams for future data requests that have predicted timings greater than the preset threshold.

4. The method of claim 1, wherein the altering further comprises:
    detecting an early data prefetch for the one of the data streams;
    delaying the early data prefetch for the one of the data streams; and
    prefetching data from at least another of the data streams during the delay for the one of the data streams.

5. The method of claim 1, further comprising:
    recording a time for each cache miss;
    localizing miss address streams with an instruction address;
    linking each miss address of the miss address streams to a corresponding recorded time for each cache miss; and
    determining a time distance between consecutive cache misses.

6. The method of claim 5, further comprising:
    determining a plurality of time strides, each of the plurality of time strides representing a different time value;
    computing further prefetch addresses based upon the miss addresses and the determined time strides.

7. The method of claim 1, wherein a prefetching module issues the plurality the data prefetches to prefetch data to a memory cache in combination with the processor.

8. The method of claim 1, wherein altering timings of data prefetches within each prefetch stream comprises:
    recording a cache miss in response to one of the data prefetches in the one of the data streams; and
    recording a second cache miss in response to a second of the plurality of data prefetches in the one of the data streams.

9. The method of claim 8, further comprising:
    maintaining a reference prediction table of data prefetches;
    issuing the plurality of data prefetches as a function of the reference prediction table;
    determining a time interval between the first cache miss and the second cache miss; and
    enhancing the reference prediction table with the determined time interval and an address distance of the first and second cache misses.

10. The method of claim 9, further comprising:
    classifying the time interval into one of a plurality of predetermined time interval classifications; and
    altering a timing of a further request to prefetch data according to the reference prediction table as a function of the classification of the time interval between the first cache miss and the second cache miss.

11. An article comprising a non-transitory machine readable medium storing executable instructions for implementing the method of claim 1.

12. An apparatus for computing, comprising:
    a client device including a processor or processing core that is capable of processing an application, and a memory system;
    a prefetch engine to observe a data request pattern of the application processed by the client device and predicting future data requests of the client device, the prefetch engine executing the method of claim 1; and
    a miss counter to measure a time interval of each cache miss of the prefetch engine.

13. A method for prefetching data from memory for data requests of a multicore data processor, comprising:
    issuing a plurality of data prefetches within each of a plurality of prefetch streams;

predicting timings of future data requests within each of the prefetch streams to prefetch data from a memory device to a memory cache in combination with the processor, wherein the predicting for each of the prefetch streams is determined using time intervals between cache misses within that each of the prefetch streams;

linking the data prefetches of the prefetch streams, wherein upon determining that a predicted timing for a future data request within a first stream of the prefetch streams is greater than a predetermined threshold and is expected to result in an early data prefetch:
 delaying data prefetch for the first stream to avoid the early data prefetch; and
 prefetching data within a second stream of the prefetch streams during the delay for the first stream; and
timely prefetching data within the first stream after prefetching data within the second stream.

14. The method of claim 13, further comprising continually determining predicted timings of future data prefetches for each of the prefetch streams upon each further cache miss in the each of the prefetch streams, wherein predicted timings are determined between a most recent cache miss and a previous miss.

15. The method of claim 13, further comprising:
recording a time for each cache miss;
localizing miss address streams with an instruction address;
linking each miss address of the miss address streams to a corresponding recorded time for each cache miss; and
determining a time distance between consecutive cache misses.

16. The method of claim 13, wherein all of the plurality of data streams are linked to avoid early prefetches by delaying data prefetches within corresponding data streams for data requests that have predicted timings greater than the preset threshold.

17. The method of claim 13, wherein a prefetching module issues the plurality the data prefetches to prefetch data to a memory cache in combination with the processor.

18. The method of claim 17, wherein the prefetching module comprises a stride prefetcher including a reference prediction table, and further comprising storing timing of cache misses in the reference prediction table.

19. The method of claim 13, wherein predicting timings of data prefetches comprises:
 recording a cache miss in response to one of the data prefetches in the one of the data streams; and
 recording a second cache miss in response to a second of the plurality of data prefetches in the one of the data streams.

20. The method of claim 19, further comprising:
maintaining a reference prediction table of data prefetches;
issuing the plurality of data prefetches as a function of the reference prediction table;
determining a time interval between the first cache miss and the second cache miss;
classifying the time interval into one of a plurality of predetermined time interval classifications;
enhancing a reference prediction table with the determined time interval and an address distance of the first and second cache misses; and
delaying the data prefetch for the first stream according to the reference prediction table as a function of the classification of the time interval between the first cache miss and the second cache miss.

* * * * *